US007017114B2

(12) United States Patent
Guo et al.

(10) Patent No.: US 7,017,114 B2
(45) Date of Patent: Mar. 21, 2006

(54) AUTOMATIC CORRELATION METHOD FOR GENERATING SUMMARIES FOR TEXT DOCUMENTS

(75) Inventors: Zhi Li Guo, Beijing (CN); Li Ping Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 776 days.

(21) Appl. No.: 09/943,341

(22) Filed: Aug. 31, 2001

(65) Prior Publication Data

US 2002/0052901 A1 May 2, 2002

(51) Int. Cl.
G06F 15/00 (2006.01)
G06F 17/00 (2006.01)
G06F 17/21 (2006.01)
G06F 17/30 (2006.01)
G06F 7/00 (2006.01)

(52) U.S. Cl. .......................... 715/531; 715/530; 707/1; 707/3; 707/4; 707/6

(58) Field of Classification Search ................ 715/530, 715/531; 707/1, 3–4, 6
See application file for complete search history.

(56) References Cited

U.S. PATENT DOCUMENTS 6,334,132 B1 * 12/2001 Weeks ........................ 707/101
6,470,307 B1 * 10/2002 Turney ........................ 715/531
6,493,663 B1 * 12/2002 Ueda ........................... 715/531
6,738,678 B1 * 5/2004 Bharat et al. .................. 707/5
6,766,287 B1 * 7/2004 Kupiec et al. .............. 715/531
2001/0021938 A1 * 9/2001 Fein et al. ................... 707/531
2002/0080196 A1 * 6/2002 Bornstein et al. ........... 345/854

OTHER PUBLICATIONS

Chen et al., Extraction of Indicative Summary Sentences from Imaged Documents, Aug. 20, 1997, Document Analysis and Recognition, Proceedings of the Fourth International, vol.: 1, pp. 227-232.*

* cited by examiner

Primary Examiner—William Bashore
Assistant Examiner—Chau Nguyen
(74) Attorney, Agent, or Firm—Law Office of Charles W. Peterson, Jr.; Louis J. Percello, Esq.; Satheesh K. Karra, Esq.

(57) ABSTRACT

A method and program product to generate summaries for text documents. A user can also specify a query, topic, and terms that he/she is interested in. This method determines the importance of each sentence by using the linguistic salience of the word to the user profile, the similarity among the word, the query and topic provided by a user and the sum of scores of the sentence comprising the word. After computing the score for each word, this method computes the score for each sentence in the set of sentences according to the score of words composing it and the position of the sentence in a section and a paragraph.

16 Claims, 2 Drawing Sheets

AUTOMATIC CORRELATION METHOD FOR GENERATING SUMMARIES FOR TEXT DOCUMENTS

BACKGROUND OF THE INVENTION

1. Field of the Invention

This invention relates to an automatic text processing method, and in particular, to a method for generating summaries for text documents.

2. Background Description

In information query, for the user's convenience, it is normally required that the summaries are generated for the users by means of automatic text processing functions of the computers. The current practical methods for automatically generating summaries for text documents are following four kinds:

List the first paragraph of the document or the beginning paragraphs of the document as the summary (Infoseek, Yahoo, etc.): This method is simple, but does not suit for common document style;

List the sentences in the query commands (Lotus website, Beijing Daily Online, etc.): The listed sentences relate directly to the query, but cannot represent the overall style of the document;

Use implicit template: This method matches some patterns in the document, and then fills the matched contents into the pre-formed template. This method can generate very fluent summaries, but can only be suitable for a fixed document style and a specific domain, and is very difficult to be used commonly;

Count the occurrence frequency of words or characters: This is a statistics-based method, which generally can be divide into four steps: (1) analyze the document discourse, and segment the document into paragraphs and sentences; (2) segment the sentences into words; (3) evaluate the scores of the importance of the words and the sentences; (4) output the sentences with higher evaluated scores as the document's summary.

Although the above statistics-based method for automatically generating summaries for text documents has considered the occurrence frequency of words and characters in documents and therefore evaluated the importance of the words and the sentences, the summaries can not well correspond to the user's requirements because there is no interaction with the user. Therefore, the invention proposes a method for automatically generating summaries for text documents, which, when receiving the user's text documents, queries the fields, topics, and terms that the user is interested in. The method extracts the important sentences, and then in reasonable order, outputs them as the document's summary. The method can not only generate summaries for respective documents, but also generate a comprehensive prompt for the important ideas of the documents.

SUMMARY OF THE INVENTION

The method for automatically generating summaries for text documents according to the invention includes steps of:

For a set of documents, generating a set of sentences by document discourse analysis, and obtaining a set of words by morphologic processing;

Initializing a score for each word in the set of words, and each sentence in the set of sentences;

Computing the score for each word in the set of sentences according to the scores of sentences containing it and the correlation degree between the word and the user information;

Computing the score for each sentence in the set of sentences according to the scores of words composing it and the position of the sentence in a section and a paragraph;

If the sum of scores of the words and the sum of scores the sentences change apparently, go back to the step of computing the word scores, otherwise continuing.

Outputting the top-ranked sentences as the summary of the set of documents, the top-ranked words as keywords list of the set of documents.

The above method introduces the following functions into the traditional statistics-based methods:

It has a new sentence ranking strategy called "automatic correlation method", which is much responsive to user's requirements;

It supports user summarization profile, which allows a user to customize the fields, topics, and terms that the user is interested in.

It applies to general-purpose, and is also suited for summarizing the certain query documents.

The method considers the following factors when computing the scores of words in a word set: the correlation degree between the word and the user's summarization profile language; the similarity degree between the word and the query term or topic provided by the user; sum scores of the sentences to which the word belongs; the similarity degree between the word and the word terms in the document title; the ratio of the occurrence times of the word in the document to its occurrence times in the document set; and the ratio of number of the documents in which the word occurs, to the total number of the documents contained in the document set.

BRIEF DESCRIPTION OF THE DRAWINGS

The advantages and features of the invention will be more apparent by the description of preferred embodiments of the invention in conjunction with the accompanying figures, in which.

DESCRIPTION OF THE PREFERRED EMBODIMENTS

Figure 1:
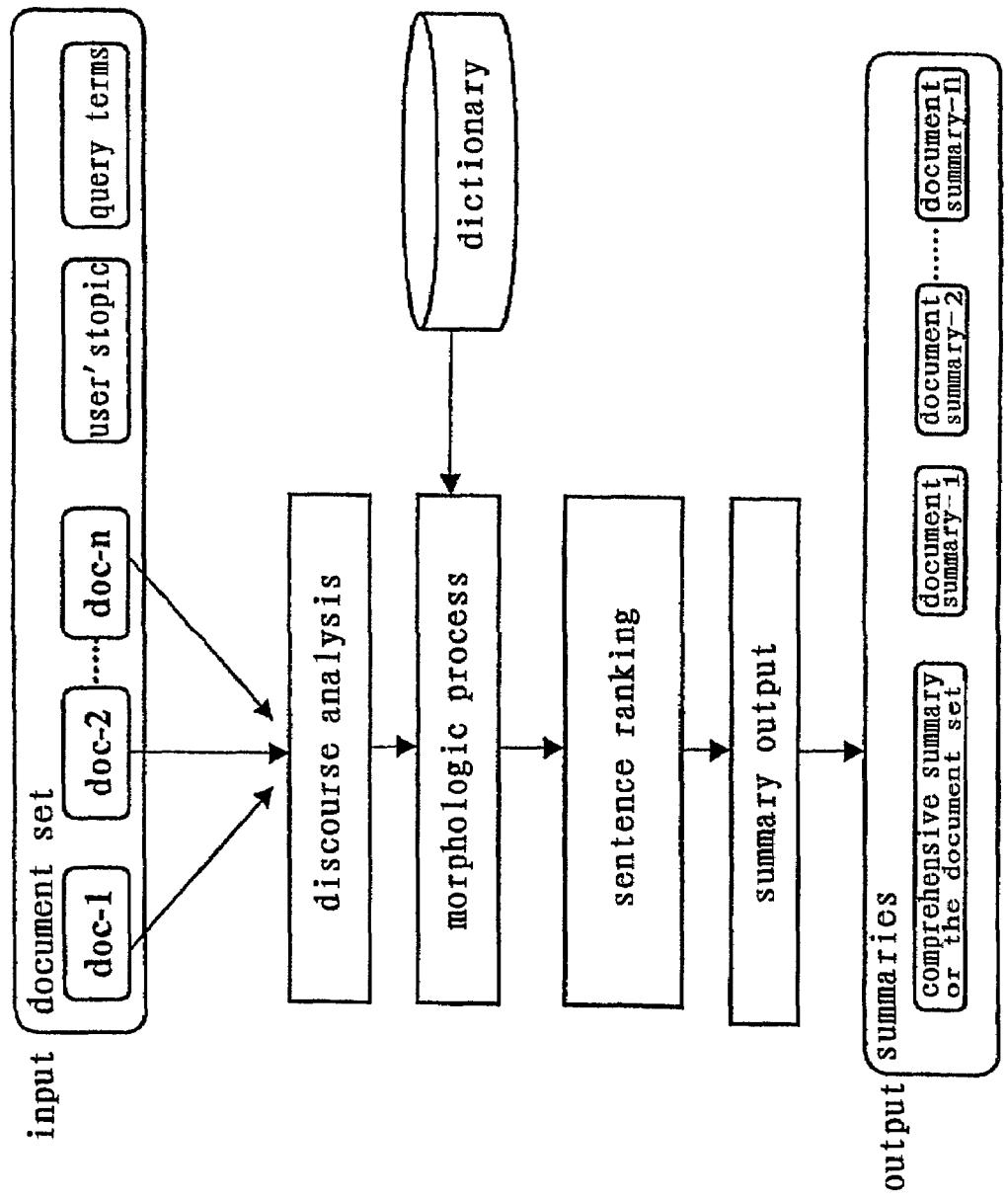
FIG. 1 is a flow chart of the method for automatically generating summaries for text documents according to a particular embodiment of the invention.

As shown in FIG. 1, a method for automatically generating summaries for text documents according to a particular embodiment of the invention includes steps of:

Step 1. Document Discourse Analysis

This step identifies titles, sections, lists, paragraph boundaries and sentence boundaries of the documents.

Step 2. Morphologic Process

This step performs morphologic process for each sentence according to the language of documents. For Chinese language, the morphologic process includes the steps of: (1) segmenting sentences into words according to the system dictionary and the user-defined dictionaries; (2) identifying proper names (currently including person names, place names and person titles), domain terms, numbers, measure words, and date expressions; (3) adding part-of-speech tags to each word; (4) resolving the pronominal anaphora of the personal pronouns; (5) identifying the word relationship (such as same object names, synonyms, concept relationships, etc.) and building a relationship network among all of the words, according to the system thesaurus and user thesaurus. For English language, this step includes the steps of: (1) normalizing terms to a standard term; (2) identifying proper names; (3) splitting compound terms; and (4) filtering stop-word.

Step 3. Sentence Ranking

This step is to determine the importance of each sentence by an automatic correlation algorithm. This step is described in more details below.

Step 4. Summary Output:

If the user requires one summary for one document, then this step selects the top-ranked sentences to output according to their appearing order in this document;

If the user requires a single comprehensive summary for the document set, then this step outputs the sentences according to their computed scores from high to low and marks the sentences to show from which document they come (for example, by adding hyperlinks to the sentences), so that the user can easily look up the respective document.

In both cases the pronouns will be replaced by their entities.

Figure 2:
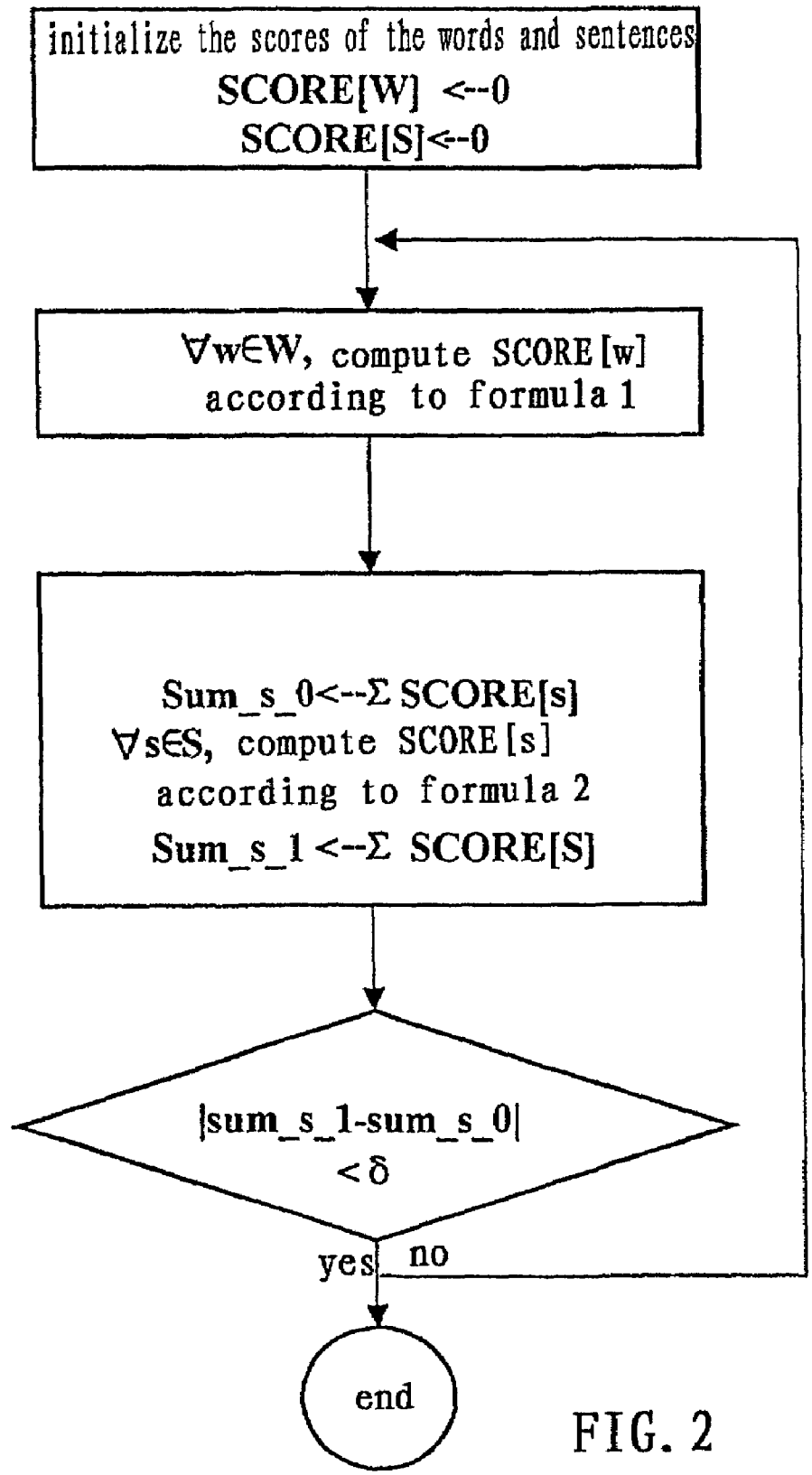
FIG. 2 is a flow chart used in the sentence ranking part in FIG. 1.

After the document discourse analysis and the morphologic process are performed for each document in the document set D, each sentence in the document set is ranked to decide its important degree according to the sentence set S and the word set W of each document. The sentences are ranked to compute their scores from each other by using an autonomous correlation method, i.e. by using the sentence set S and the word set W. This is realized by the steps below (see FIG. 2):

Step 1. Introducing a data group SCORE to record the computed scores of the sentences and the words, and initializing a score SCORE[s] of each sentence and a score SCORE[w] of each word into 0;

Step 2. Computing a score SCORE[w] of each word according to the weighted-average of the following values:

The correlation degree between W and the user's summarization profile language;

The similarity degree between W and the query terms or topic provided by the user;

Sum scores of the sentences to which W belongs;

The similarity degree between W and the word terms in each document title;

The ratio of the occurrence times of W in the document to its occurrence times in the document set; and The ratio of number of the documents in which W occurs, to the total number of the documents contained in the document set D;

This can be written by the following formula, i.e.

$$SCORE[w]=\lambda_1 * salience(w, \text{user summarization profile})+\lambda_2 * salience(w, \text{user's query or topic})+\lambda_3 * \Sigma(SCORE[s], s \ni w)+\lambda_4 * salience(w, \text{title words})+\lambda_5 * FREQUENCY(w/d)/FREQUENCY(w/D)+\lambda_6 * NUMBER(d, d \ni w)/NUMBER(D) \quad \text{Formula 1}$$

Step 3. Computing the SCORE[s] of the sentence according to the weighted-average of the three values below:

Sum scores of all the words constituting the sentences;

The position of the sentence in the paragraph and section: the fist sentences in the paragraph and section get higher scores than the sentences in other positions;

The similarity among the sentences: if in many documents there are sentences whose contents are similar, these sentences are weighted more;

This can be written as the following formula $$SCORE[s]=\lambda_7 * \Sigma(SCORE[w], s \ni w)+\lambda_8 * position(s, d)+\lambda_9 * similarity(s,S) \quad \text{Formula 2}$$

Step 4. If the sum of the all scores changes significantly, cycle Step 2; otherwise the process ends.

It is seen according to the description of the invention in conjunction with the particular embodiments that the summary method of the invention is also a statistics-based method, which performs the discourse analysis and the morphologic process, and that the new functions of the method are:

Allowing the user to customize "the user summary profile" in which the user can list the fields and topics he or she interested in, and also listed he or she is sensitive to which kind of word (such as person names, person titles, place names, numbers, amounts of money, dates, terms defined by the user own, etc.);

The generated summaries being capable of being driven by subjects or the user's query;

A completely new sentence ranking strategy, herein called "automatic correlation method": the first step, initializing the ranking score for the words and sentences; the second step, computing scores for every words according to the user summarization profile, topics or query terms provided by the user, and frequencies of the words; the third step, computing the ranking scores according to the words contained in the sentences and the document discourse in the document set; the fourth step, feedbacking the sentence scores to the words and repeating the second step and the third step, until the sentence scores have been stabilized.

This method fully utilizes the dicourse information of every document, the clue words in the document, the title words, the language processing results, and topics or query terms provided by the user, to make the generated summaries accord with the user's requirements more completely.

The flow charts described here are only exemplary, and many modifications can be made to those chart examples or the steps (or operations) described therein without departing from the spirit of the invention. For example, those steps can be executed in different order, or increased, reduced or improved. Therefore, those changes are considered as a part of the invention which points out the claims.

Although the preferred embodiments have been described here, it is apparent to those skilled in the art that various of modifications, complements, replacements and similar changes can be made without departing from the spirit of the invention, therefor those alternations are considered to be in the inventive scope defined by the appended claims.

We claim:

1. An automatic method for generating summaries for text documents, comprising steps of:

generating a set of sentences for a set of documents by document discourse analysis and a set of words by morphologic process;

initializing a word score for each word in the set of words, a sentence score for each sentence in the set of sentences and a score sum;

computing an aggregated word score for said each word according to an aggregate of sentence scores of sentences containing said each word and to a degree of correlation between said each word and user related information;

wherein said aggregated word score (SCORE[w]) has a weighted ($\lambda$) relationship with each of said aggregated sentence score (SCORE[s]), linguistic salience of said each word to a user profile (salience(w, user summarization profile)), similarities among said each word, a query and a provided topic (salience(w, user's query or topic)), similarities among said each word and terms in titles of the documents (salience(w, tile words)), a ratio of an occurrence number for said each word in a document to a total occurrence number for said each word in the set of documents (FREQUENCY(w/d)/FREQUENCY(w/D)), and a ratio of a number of documents including said each word to a total number of documents in the set of documents (NUMBER(d, d∋w)/NUMBER(D)), of the form $$SCORE[w]=\lambda_1*salience(w, \text{user summarization profile})+\lambda_2*salience(w, \text{user's query or topic})+\lambda_3*\Sigma(SCORE[s], s∋\omega)+\lambda_4*salience(w, \text{title words})+\lambda_5*FREQUENCY(w/d)/FREQUENCY(w/D)+\lambda_6*NUMBER(d, d∋w)/NUMBER(D);$$

computing an aggregated sentence score for said each sentence according to an aggregate of word scores composing said each sentence and a respective sentence position in a section and a paragraph;

comparing an aggregate sum with said score sum, said aggregate sum being a sum of aggregated word scores and aggregated sentence scores; and if said aggregate sum is different than said score sum, returning to the step of computing the aggregated word scare; otherwise, outputting top-ranked sentences according to sentence score as a summary of the set of documents, top-ranked words according to word score as a keywords list of the set of documents.

2. An automatic method according to claim 1, wherein the step of computing the aggregated word score for said each word comprises:
computing a score for said each word according to linguistic salience of said each word to a user profile.

3. An automatic method according to claim 1, wherein the step of computing the aggregated word score for said each word comprises:
computing a score for said each word according to similarities among said each word, a query and a provided topic.

4. An automatic method according to claim 1, wherein the step of computing the aggregated word score for said each word comprises:
computing a score for said each word according to similarities among said each word and terms in titles of the documents.

5. An automatic method according to claim 1, wherein the step of computing the aggregated word score for said each word comprises:
computing a score for said each word according to a ratio of an occurrence number for said each word in a document to a total occurrence number for said each word in the set of documents.

6. An automatic method according to claim 1, wherein the step of computing the aggregated word score for said each word comprises:
computing a score for said each word according to a ratio of a number of documents including said each word to a total number of documents in the set of documents.

7. An automatic method according to claim 1, wherein document discourse analysis comprises identifying titles, sections, lists, paragraph boundaries and sentence boundaries of the documents.

8. An automatic method according to claim 1, wherein said aggregate sentence score further has a weighted relationship with each of said aggregated word score, sentence position (position(s, d)) and similarity (similarity(s, S)) of the form $$SCORE[s]=\lambda_7*\Sigma(SCORE[w], s∋w)+\lambda_8*position(s, d)+\lambda_9*similarity(s, S).$$

9. A computer program product for automatically generating summaries for text documents, said computer program product comprising a computer usable medium having computer readable program code thereon, said computer readable program code comprising:

computer program code means for generating a set of sentences for a set of documents by document discourse analysis and a set of words by morphologic process;

computer program code means for initializing a word score for each word in the set of words, a sentence score for each sentence in the set of sentences and a score sum;

computer program code means fix computing an aggregated word score for said each word according to an aggregate of sentence scores of sentences containing said each word and computing a degree of correlation between said each word and user related information;

computer program code means for computing an aggregated sentence score for each sentence in the set of sentences according to an aggregate of word scores composing it and a respective sentence position in a section and a paragraph;

wherein said aggregated word score (SCORE[w]) has a weighted (λ) relationship with each of said aggregated sentence score (SCORE[s]), linguistic salience of said each word to a user profile (salience(w user summarization profile)), similarities among said each word, a query and a provided topic (salience(w, user's query or topic)), similarities among said each word and terms in titles of the documents (salience(w, tile words)), a ratio of an occurrence number for said each word in a document to a total occurrence number for said each word in the set of documents (FREQUENCY(w/d)/FREQUENCY(w/D)), and a ratio of a number of documents including said each word to a total number of documents in the set of documents (NUMBER(d, d∋w)/NUMBER(D)), of the form $$SCORE[w]=\lambda_1*salience(w, \text{user summarization profile})+\lambda_2*salience(w, \text{user's query or topic})+\lambda_3*\Sigma(SCORE[s], s∋\omega)+\lambda_4*salience(w, \text{title words})+\lambda_5*FREQUENCY(w/d)/FREQUENCY(w/D)+\lambda_6*NUMBER(d, d∋w)/NUMBER(D)$$

computer program code means for computing an aggregate sum from aggregated word scores and aggregated sentence scores;

computer program code means for determining if said aggregate sum is different than said score sum and for selectively replacing said score sum with said aggregate sum, each said word scare with a corresponding said aggregated word score and each said sentence score with a corresponding said aggregated sentence score; and computer program code means for outputting top-ranked sentences according to sentence score as a summary of the set of documents, top-ranked words according to word score as a keywords list of the set of documents.

10. A computer program product for automatically generating summaries according to claim 9, wherein the computer program code means for computing the aggregated word score for said each word comprises:

computer program code means for computing a score for said each word according to linguistic salience of said each word to a user profile.

11. A computer program product for automatically generating summaries according to claim 9, wherein the computer program code means for computing the aggregated word score for said each word comprises:

computer program code means for computing a score for said each word according to similarities among said each word, a query and a provided topic.

12. A computer program product for automatically generating summaries according to claim 9, wherein the computer program code means for computing the aggregated word score for said each word comprises:

computer program code means for computing a score for said each word according to similarities among said each word and terms in titles of the documents.

13. A computer program product for automatically generating summaries according to claim 9, wherein the computer program code means for computing the aggregated word score for said each word comprises:

computer program code means for computing a score for said each word according to a ratio of an occurrence number for said each word in a document to a total occurrence number for said each word in the set of documents.

14. A computer program product for automatically generating summaries according to claim 9, wherein the computer program code means for computing the aggregated word score for said each word comprises:

computer program code means for computing a score for said each word according to a ratio of a number of documents including said each word to a total number of documents in the set of documents.

15. A computer program product for automatically generating summaries according to claim 9, wherein computer program code means for generating a set of sentences for a set of documents by document discourse analysis comprises computer program code means for identifying titles, sections, lists, paragraph boundaries and sentence boundaries of the documents.

16. A computer program product for automatically generating summaries according to claim 9, wherein said aggregate sentence score further has a weighted relationship with each of said aggregated word score, sentence position (position(s, d)) and similarity (similarity(s, S)) of the form $$SCORE[s] = \lambda_7 * \Sigma(SCORE[w], s \ni w) + \lambda_8 * position(s, d) + \lambda_9 * similarity(s, S).$$

\* \* \* \* \*